July 10, 1956  M. H. VARN  2,753,632
HAND TOOL FOR CUTTING CRABGRASS AND THE LIKE
Filed May 20, 1953
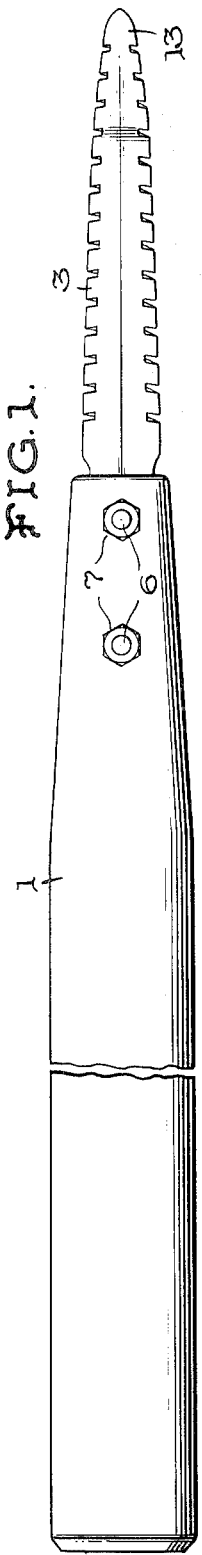
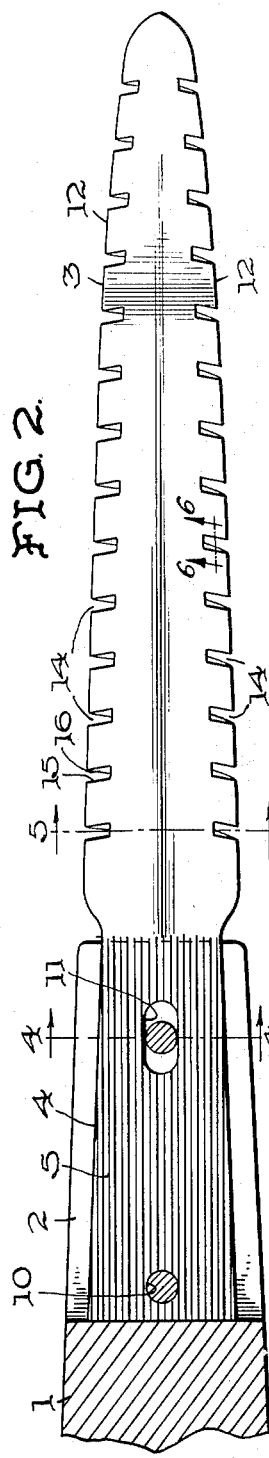
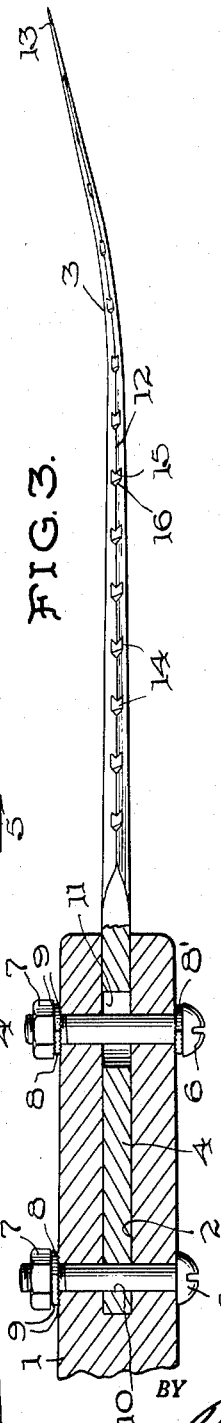
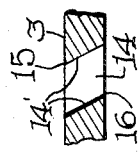
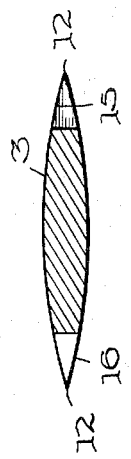
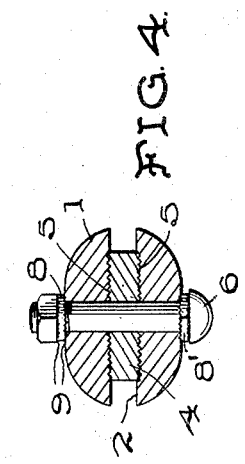
INVENTOR.
M. H. Varn
BY Robb & Robb
Attorneys.

United States Patent Office 2,753,632
Patented July 10, 1956

2,753,632

HAND TOOL FOR CUTTING CRABGRASS AND THE LIKE

Madison H. Varn, Chevy Chase, Md.

Application May 20, 1953, Serial No. 356,159

1 Claim. (Cl. 30—355)

The present invention relates to weeding implements, and more particularly to a knife which is particularly well-suited for use in removing undesirable and unsightly crabgrass from lawns.

Crabgrass is a well-known annual grass which is coarse, invasive and very prolific. It has strong, deep roots which spread in all directions, and a crown which grows on or near the surface of the ground. In the fall of the year, after the first frost, crabgrass turns brown and gives an undesirable and unsightly appearance to a lawn containing blue grass or other permanent grasses which usually remain green throughout the winter. Even though crabgrass dies in the fall and will not again grow in the spring, it produces during the summer months an abundance of seed which germinates early the following spring wherever the seed can find room to grow.

Heretofore, implements have been produced for digging up crabgrass by the roots. This method of eradication, while being effective, leaves a substantial pocket where the crabgrass has been removed, thus requiring filling in wherever such a pocket exists. However, since crabgrass is an annual plant, that is, it grows from seed only one growing season and then dies, removal of the roots is unnecessary and undesirable.

On the other hand, chemical crabgrass killers have been utilized to destroy the same, but merely destroying the crabgrass itself does not destroy the seed which has previously been produced by the crabgrass, and the dead crabgrass remains in the lawn to mar its beauty. Moreover, these chemical agents are oftentimes harmful to the good lawn grasses, shrubs, and the like, and great care must be exercised in using such poisonous materials.

Accordingly, a primary object of the present invention is to provide a novel and improved implement for removing or eradicating crabgrass or the like from lawns.

Another object is to provide such an implement which is capable of easily cutting the crown from the roots of crabgrass, without cutting a hole in the ground, thus leaving the more desirable grasses free to grow in the space formerly occupied by the crabgrass and to thereby preclude the future growth of crabgrass seed in such a bare spot.

A further object is to provide such an implement with a cutting blade of novel form which is particularly well-suited for cutting crabgrass, said blade being longitudinally curved or arched at its free end and having sharp cutting edges on the opposite lateral sides thereof, as well as having in each of its lateral edges a plurality of longitudinally spaced kerfs or slots which are so formed in the blade as to provide opposed cutting teeth on the opposite sides of each kerf or slot.

Still another object is to provide an improved implement as aforesaid, wherein the kerfs are disposed at an angle to the axis of the blade and preferably incline rearwardly so as to render the blade self-cleaning, by preventing the collection of grass, dirt and the like in the kerfs.

Other objects, advantages and features of the present invention will be hereinafter described or will become apparent to those skilled in the art, and the novel features thereof will be defined in the appended claim.

In the drawing:

Fig. 1 is a view in top plan of a crabgrass knife embodying the present invention;

Fig. 2 is an enlarged fragmentary view showing the blade in plan, with a portion of the handle broken away to disclose the connection between the blade and the handle;

Fig. 3 is an enlarged fragmentary view, partly in vertical section and partly in side elevation to disclose the connection between the blade and the handle;

Fig. 4 is a view in transverse section, as taken on the line 4—4 of Fig. 2;

Fig. 5 is an enlarged view in transverse section, as taken on the line 5—5 of Fig. 2; and Fig. 6 is an enlarged sectional view, taken substantially in the plane of the line 6—6 in Figure 2.

Like reference characters in the several views of the drawing designate corresponding parts.

The crabgrass knife preferably includes a wooden or other rigid handle 1 of substantial length for appropriate leverage and ease of manipulation, said handle having a longitudinally extended recess or slot 2 in one end thereof. Removably secured in the slot 2 is a cutting blade 3 having a longitudinally extended tang 4 thereon. The tang 4 extends into the slot 2, and on its top and bottom faces is provided with a roughened surface, preferably formed by a plurality of longitudinally extended ribs or teeth 5. These teeth or ribs 5 are adapted to bite into the handle material and prevent lateral play between the blade and the handle during use of the implement, when the tang is clamped in the handle slot 2.

To clamp the tang 4 in the slot 2, a plurality of headed screw fasteners 6 extend through the handle 1 and the tang 4, and nuts 7 are utilized to apply a clamping pressure on the handle.

Preferably interposed between each of the nuts 7 and the handle 1 is a split lock-washer 8 having its opposite faces knurled or serrated, as at 9, so as to bite into the handle and into the nut for effectively precluding loosening of the fasteners 6. Since the forward screw 6 and its nut 7 apply the main clamping pressure on the handle to secure the blade in position, a serrated lock-washer 8' is also preferably interposed between the head of this screw and the handle to prevent the head of the screw from being drawn into the handle material and, obviously if desired, a similar washer may be used beneath the head of the rear screw 6, but is not essential.

The tank 4 is preferably drilled, as at 10, adjacent to its rear end, so as to allow one of the screws 6 to extend therethrough, and, adjacent to its forward end, the tang 4 is preferably provided with a longitudinally extended slot 11 through which the other clamping screw 6 extends. By virtue of this arrangement, a degree of variation is permitted between the axes of the screws 6 and the openings 10 and 11 through the tang 4, and precision drilling of the handle 1 and the tang 4 is not necessary.

The blade 3 of the cutting implement is generally eliptical in cross-section, as is shown in Fig. 5, and the opposite edges thereof are each formed with a sharp knife edge 12. Throughout a portion of its length, the blade 3 is substantially straight, but at its forward end, it is longitudinally curved or arched upwardly, as is best shown in Fig. 3. Also, as is shown in Fig. 3, the blade 3 decreases in thickness from its rear end towards its free end 13, and the free end 13 is very thin and flexible for a purpose which will be hereinafter more particularly described.

The opposite lateral edge portions of the blade 3 are each formed with rearwardly inclined kerfs or slots 14, and the two side walls 14' of each kerf or slot are parallel and inclined from a plane normal to the top and bottom surfaces of the blade so as to provide a pair of vertically spaced and longitudinally offset cutting edges 15, 16 at the junction of the leading edges of the side walls 14' of each slot with the respective top and bottom surfaces of the blade.

Accordingly, each lateral edge of the blade 3 has a knife edge 12 capable of cutting upon lateral movement of the blade in either direction, and each of said edges also has a plurality of bevelled top and bottom cutting edges 15 and 16 capable of sawing or cutting upon longitudinal movement of the blade in either direction.

In use, the flexible end 13 of the blade 3 is initially placed below but adjacent to the crown of a clump of crabgrass or the like, the inherent flexibility of the blade allowing the same to bow slightly, depending upon the downward pressure applied thereto. The implement is then shifted laterally into contact with the crabgrass and, at the same time, a longitudinal reciprocation is imparted to the implement. The knife edge 12 will cut through the tough crabgrass, or if desired, the bevelled cutting edges 15 and 16 can be utilized to produce a sawing action thereon responsive to longitudinal reciprocation of the implement. The crabgrass crown will thus be severed from the roots at a point at or near the ground level, and no unsightly pocket will be made in the turf. Thus, desirable grasses can readily spread in and grow up in the space vacated by the crabgrass and crown, and future growth of new crabgrass will be precluded.

During the cutting operation, the rearward inclination of the cutting edges 15 and 16 not only improves the cutting ability thereof, but automatically cleans the kerfs 14 as the blade passes through the material being cut, and minimizes clogging of the kerfs.

While the specific details have been herein shown and described, the invention is not limited thereto, since changes and alterations may be resorted to without departing from the spirit thereof as defined in the appended claim.

I claim:

A crabgrass cutting tool comprising a handle, and an elongated blade of resiliently flexible material secured to said handle, said blade being longitudinally tapered and curved longitudinally upwardly at its tapered end portion, said blade being substantially elliptical in cross-section and having sharp longitudinal knife edges, the longitudinal edge portions of said blade being provided with sets of spaced slots extending obliquely inwardly from the longitudinal edges, each of said slots having a pair of parallel side walls inclined from a plane substantially normal to the top and bottom surfaces of the blade and providing a pair of vertically spaced and longitudinally offset cutting edges at the junction of the leading edges of the side walls of each slot with the respective top and bottom surfaces of the blade.

References Cited in the file of this patent

UNITED STATES PATENTS

| 1,492,134 | Kyle | Apr. 29, 1924 |
| 1,993,170 | Havener | Mar. 5, 1935 |
| 2,059,414 | Taylor | Nov. 3, 1936 |
| 2,513,663 | McDaniel | July 4, 1950 |
| 2,533,014 | Jacobson | Dec. 5, 1950 |

FOREIGN PATENTS

| 21,005 | Great Britain | Oct. 19, 1901 |